(No Model.)
B. B. SCHNEIDER & H. BROOKE.
METHOD OF SECURING GLASS AND METAL ARTICLES TOGETHER.
No. 342,045. Patented May 18, 1886.
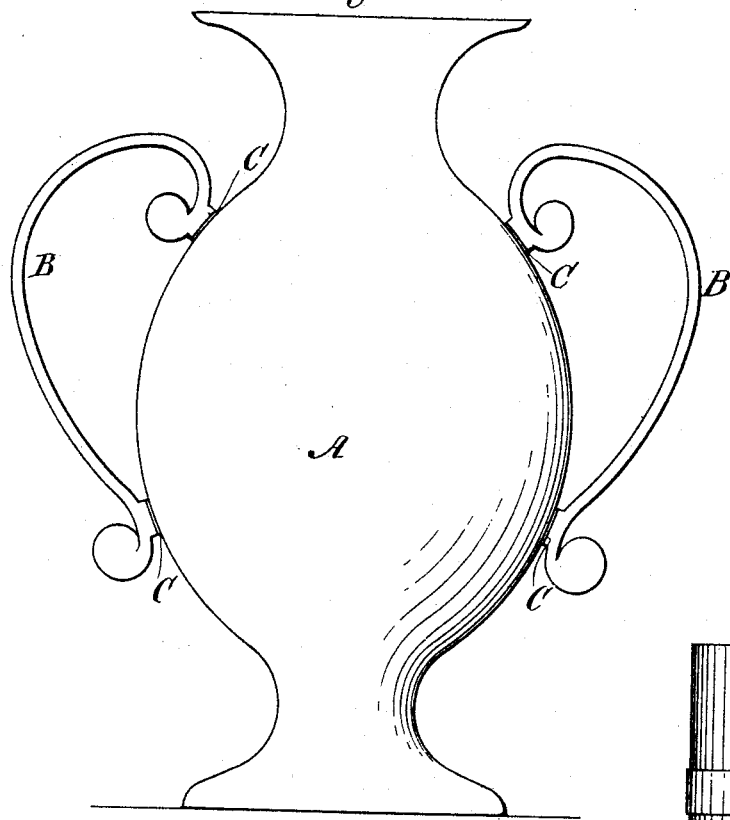
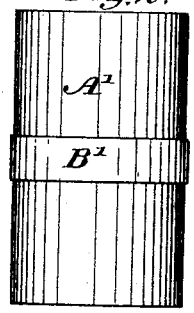
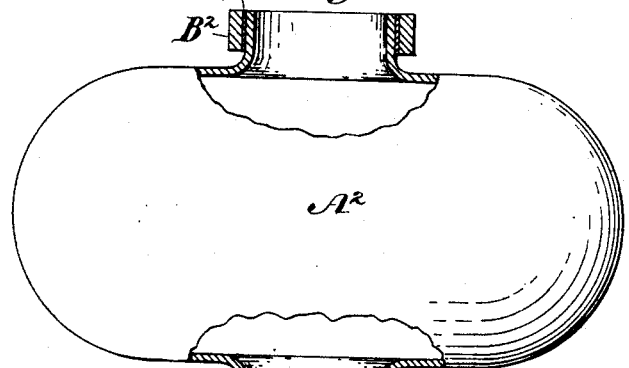

UNITED STATES PATENT OFFICE.

BENNETT B. SCHNEIDER AND HOMER BROOKE, OF NEW YORK, N. Y.

METHOD OF SECURING GLASS AND METAL ARTICLES TOGETHER.

SPECIFICATION forming part of Letters Patent No. 342,045, dated May 18, 1886.

Application filed March 5, 1886. Serial No. 194,190. (No model.)

*To all whom it may concern:*

Be it known that we, BENNETT B. SCHNEIDER and HOMER BROOKE, of New York, in the county and State of New York, have invented a certain new and useful Improvement in the Method of Securing Glass and Metal Articles Together, of which the following is a specification.

The object of our improvement is to provide for securing articles of glass and metal together in a superior manner.

Our improvement consists in a new method of securing together articles of glass and metal by coating the surface of the metal article where it and the glass article are to be secured with a vitreous coating or enamel, which will adhere thereto, and then place the two articles together while the glass article is in a heated state.

In carrying out our improvement we employ any vitreous coating or enamel which will adhere to the surface of metal. We prepare the metal article by applying such coating or enamel to that surface which is to be secured to the glass. Then when the glass article is in a heated state we place the metal article and the glass article in contact, pressing them together as forcibly as may be necessary to make a firm union.

The glass article may be taken at any stage in its manufacture and while heated during its manufacture, or it may be specially heated after its manufacture shall have been completed.

Any suitable vitreous enamel may be employed. Indeed powdered glass fused on the metal may be used.

A secure union of metal and glass articles may be made by means of our improvement. A joint impervious both to air and water can thus be made.

Various articles may be made to advantage with the aid of our invention. Glass linings may be fastened in cups and other vessels made of metal. Handles and various ornaments of metal may be fastened to articles made of glass, or handles and various ornaments of glass may be fastened to articles of metal.

Various fittings of metal, which heretofore have been secured by plaster or cement to articles of glass, can be secured according to our invention.

In the accompanying drawings, Figure 1 is a side view of an urn embodying our improvement. Fig. 2 is a side view of a glass jar embodying the improvement. Fig. 3 is a sectional side view of a lamp fount or reservoir embodying our improvement.

In Fig. 1, A designates an urn made of glass, and B designates handles made of metal secured thereto according to our improvement. C designates the vitreous coating or enamel where the union of the handles with the urn is made. We exaggerated this in the drawings to conduce to a clear understanding of the improvement.

In Fig. 2 an ornament, B', made in the shape of a band of metal, is secured to a jar of glass, A'. The band may be split to facilitate its application. The vitreous coating or enamel is between the band and the jar.

The oil fount or reservoir $A^2$ shown in Fig. 3 is intended for a lamp. It has at the center of the bottom an extension, $a$, such as is generally termed a "peg." A metal collar or socket, $B^2$, of the kind commonly used for securing a lamp fount or reservoir to its support is joined to the peg by an intervening vitreous coating or enamel, $C^2$. This collar or socket may form part of a pillar or pedestal.

What we claim as our invention, and desire to secure by Letters Patent, is—

The method of securing together articles of glass and metal by coating the surface of the metal article where it and the glass article are to be secured with a vitreous coating or enamel, and then placing the two articles together while the glass article is in a heated state, substantially as specified.

BENNETT B. SCHNEIDER.
HOMER BROOKE.

Witnesses:
D. H. DRISCOLL,
EDWIN H. BROWN.